(12) United States Patent
Zhang et al.

(10) Patent No.: US 10,772,040 B2
(45) Date of Patent: Sep. 8, 2020

(54) WIRELESS ACCESS METHOD AND APPARATUS

(71) Applicant: Huawei Technologies Co., Ltd, Shenzhen (CN)

(72) Inventors: Jian Zhang, Shenzhen (CN); Yada Huang, Shanghai (CN); Qinghai Zeng, Shanghai (CN); Xilei Cai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/119,451

(22) Filed: Aug. 31, 2018

(65) Prior Publication Data

US 2018/0368063 A1    Dec. 20, 2018

Related U.S. Application Data

(63) Continuation of application No. PCT/CN2017/075374, filed on Mar. 2, 2017.

(30) Foreign Application Priority Data

Mar. 4, 2016   (CN) .......................... 2016 1 0124677

(51) Int. Cl.
*H04W 4/00*     (2018.01)
*H04W 48/20*    (2009.01)
(Continued)

(52) U.S. Cl.
CPC .......... *H04W 48/20* (2013.01); *H04W 48/10* (2013.01); *H04W 48/16* (2013.01); *H04W 48/18* (2013.01);
(Continued)

(58) Field of Classification Search
None
See application file for complete search history.

(56) References Cited

U.S. PATENT DOCUMENTS

2005/0073977 A1   4/2005   Vanghi et al.
2007/0223516 A1   9/2007   Dunn et al.
(Continued)

FOREIGN PATENT DOCUMENTS

CN    103650598 A    3/2014
CN    104378792 A    2/2015
(Continued)

*Primary Examiner* — Khalid W Shaheed
(74) *Attorney, Agent, or Firm* — Leydig, Voit & Mayer, Ltd.

(57) ABSTRACT

A method includes: determining, by a terminal device, M pilots of N air interface technologies on a carrier, where each of the N air interface technologies corresponds to one of the M pilots; measuring, by the terminal device, at least one cell by using the M pilots, to generate a measurement report; and determining, by the terminal device, a target cell in the at least one cell based on the measurement report. After determining the target cell, the terminal device may access the target cell. In this way, a plurality of services that are greatly different may be transmitted by using the N air interface technologies, corresponding air interface technologies are provided based on different service requirements of the terminal device, and resources may be dynamically allocated to the plurality of air interface technologies, thereby effectively improving radio resource utilization.

18 Claims, 5 Drawing Sheets

(51) Int. Cl.
  *H04W 48/10* (2009.01)
  *H04W 48/16* (2009.01)
  *H04W 88/10* (2009.01)
  *H04W 88/06* (2009.01)
  *H04W 48/18* (2009.01)
  *H04W 92/10* (2009.01)

(52) U.S. Cl.
  CPC ............ *H04W 88/06* (2013.01); *H04W 88/10* (2013.01); *H04W 92/10* (2013.01)

(56) References Cited

U.S. PATENT DOCUMENTS

| | | | |
|---|---|---|---|
| 2008/0020792 A1* | 1/2008 | Falk | H04W 48/10 455/517 |
| 2008/0130570 A1 | 6/2008 | Jung et al. | |
| 2011/0014913 A1* | 1/2011 | Yoon | H04W 48/20 455/435.3 |
| 2011/0090790 A1* | 4/2011 | Bergqvist | H04W 36/0061 370/230 |
| 2013/0215772 A1* | 8/2013 | Kaur | H04W 36/0072 370/252 |
| 2014/0128115 A1* | 5/2014 | Siomina | H04W 24/10 455/501 |
| 2014/0335883 A1 | 11/2014 | Ericson et al. | |
| 2015/0180629 A1 | 6/2015 | Hernando et al. | |
| 2015/0341855 A1 | 11/2015 | Bergman et al. | |
| 2016/0219504 A1 | 7/2016 | Cho et al. | |

FOREIGN PATENT DOCUMENTS

| | | |
|---|---|---|
| EP | 2034628 A1 | 3/2009 |
| WO | 2015034202 A1 | 3/2015 |
| WO | 2016130175 A1 | 8/2016 |

\* cited by examiner

US 10,772,040 B2

WIRELESS ACCESS METHOD AND APPARATUS

CROSS-REFERENCE TO RELATED APPLICATIONS

This application is a continuation of International Application No. PCT/CN2017/075374, filed on Mar. 2, 2017, which claims priority to Chinese Patent Application No. 201610124677.5, filed on Mar. 4, 2016. The disclosures of the aforementioned applications are hereby incorporated by reference in their entireties.

TECHNICAL FIELD

Embodiments of this application relate to the communications field, and in particular, to a wireless access method and apparatus in the communications field.

BACKGROUND

A mobile broadband service usually supports only one wireless air interface technology on one carrier for service transmission, for example, supports only one multiple access manner or only one frame structure on one carrier. However, with development of mobile communications technologies, a growing number of services that are different from the mobile broadband service are introduced, and different services whose quality of service (QoS) requirements are greatly different are introduced, for example, a machine-to-machine (M2M) service. To improve utilization of an air interface technology resource, different services may be transmitted by using an air interface technology resource in a time division multiplexing manner, or different services may be transmitted by using different carriers. In a manner of transmitting different services in a time division multiplexing manner or different carriers, radio resource allocation cannot be dynamically adjusted, and the time division multiplexing manner is not good for a low delay service.

SUMMARY

A wireless access method and apparatus provided in embodiments of this application can improve radio resource utilization.

According to a first aspect, a wireless access method is provided. The method includes: determining, by a terminal device, M pilots of N air interface technologies on a carrier, where each of the N air interface technologies corresponds to one of the M pilots, M and N are integers, N is greater than or equal to M, N is greater than or equal to 2, and M is greater than or equal to 1; measuring, by the terminal device, at least one cell by using the M pilots, to generate a measurement report; and determining, by the terminal device, a target cell in the at least one cell based on the measurement report, where the terminal device supports a plurality of air interface technologies on the carrier, and the plurality of air interface technologies include the N air interface technologies.

In this way, after determining the M pilots of the N air interface technologies, the terminal device measures the at least one cell of the terminal device by using the M pilots of the N air interface technologies, and determines one or more target cells in the at least one cell based on the measurement report. The terminal device may access the target cell from a current cell. After determining the target cell, the terminal device may access the target cell. The N air interface technologies effectively use a radio resource by frequency division multiplexing one carrier. A plurality of air interface technologies may be used to transmit a plurality of services whose QoS requirements are greatly different. Corresponding air interface technologies are provided based on different service requirements of the terminal device, and resources may be dynamically allocated to the plurality of air interface technologies.

In a first possible implementation of the first aspect, the measuring, by the terminal device, at least one cell by using the M pilots, to generate a measurement report includes: measuring, by the terminal device, the at least one cell by using one of the M pilots in a same frequency range of a first air interface technology and a second air interface technology in the N air interface technologies, to generate the measurement report, where a frequency range of the first air interface technology and a frequency range of the second air interface technology at least partially overlap.

In the technical solution of this application, a target cell may be determined through measurement by using one pilot in a same frequency range of two or more air interface technologies in the N air interface technologies. Certainly, a first target cell may alternatively be determined by using a first pilot in a common frequency range of a first part of the N air interface technologies, and a second target cell may be determined in a common frequency range by using a second part of the N air interface technologies. The plurality of air interface technologies may access a same target cell, so that the plurality of air interface technologies in the same target cell support a plurality of services whose QoS requirements are greatly different, thereby improving radio resource utilization.

With reference to the foregoing possible implementation of the first aspect, in a second possible implementation of the first aspect, the measuring, by the terminal device, at least one cell by using the M pilots, to generate a measurement report includes: measuring, by the terminal device, the at least one cell by separately using a first pilot and a second pilot in the M pilots in respective frequency ranges of a third air interface technology and a fourth air interface technology in the N air interface technologies, to generate the measurement report, where the frequency range of the third air interface technology and the frequency range of the fourth air interface technology at least partially do not overlap, that is, the terminal device measures the at least one cell by using the first pilot in the frequency range of the third air interface technology, and measures the at least one cell by using the second pilot in the frequency range of the fourth air interface technology.

In each air interface technology, measurement is performed by using a pilot in a frequency range of each air interface technology, so that a plurality of target cells may be determined for the plurality of air interface technologies, thereby implementing mobility management of the plurality of air interface technologies.

With reference to the foregoing possible implementations of the first aspect, in a third possible implementation of the first aspect, before the determining, by a terminal device, M pilots of N air interface technologies on a carrier, the method further includes: receiving, by the terminal device, a system message of the at least one cell; and the determining, by a terminal device, M pilots of N air interface technologies on a carrier includes: determining, by the terminal device, the M pilots of the N air interface technologies on the carrier based on the system message.

With reference to the foregoing possible implementations of the first aspect, in a fourth possible implementation of the first aspect, before the determining, by a terminal device, M pilots of N air interface technologies on a carrier, the method further includes: receiving, by the terminal device, air interface configuration information sent by a network device, where the air interface configuration information includes information instructing the terminal device to perform communication by using the N air interface technologies and the M pilots of the N air interface technologies; and the determining, by a terminal device, M pilots of N air interface technologies includes: determining, by the terminal device, the M pilots of the N air interface technologies on the carrier based on the air interface configuration information. For example, if the terminal device supports five air interface technologies, before the terminal device performs measurement, the network device needs to send air interface configuration information to the terminal device. For example, the terminal device may be set to communicate with the network device by using three of the five air interface technologies supported by the terminal device, and the air interface configuration information includes pilots of the three air interface technologies. The terminal device determines the M pilots based on the information.

Based on the air interface configuration information sent by the network device to the terminal device, the terminal device may perform communication by using a particular air interface technology on the carrier based on the air interface configuration information, so that contention of the plurality of air interface technologies on the carrier for a resource can be avoided, thereby managing the resource.

With reference to the foregoing possible implementations of the first aspect, in a fifth possible implementation of the first aspect, the determining, by the terminal device, a target cell in the at least one cell based on the measurement report includes: determining, by the terminal device, the target cell in the at least one cell based on a measurement report of any of the N air interface technologies.

With reference to the foregoing possible implementations of the first aspect, in a sixth possible implementation of the first aspect, before the determining, by the terminal device, a target cell in the at least one cell based on the measurement report, the method further includes: determining, by the terminal device, a priority order of the N air interface technologies; and the determining, by the terminal device, a target cell in the at least one cell based on the measurement report includes: determining, by the terminal device, the target cell in the at least one cell based on the priority order of the N air interface technologies and the measurement report.

The target cell may be determined in the at least one cell by using the measurement report corresponding to the air interface technology having a highest priority, so that the determined target cell can satisfy the air interface technology having the highest priority, thereby implementing proper radio resource allocation and utilization.

With reference to the foregoing possible implementations of the first aspect, in a seventh possible implementation of the first aspect, before the determining, by the terminal device, a target cell in the at least one cell based on the measurement report, the method further includes: sending, by the terminal device, the measurement report to the network device, so that the network device determines the target cell in the at least one cell based on the measurement report; and receiving, by the terminal device, indication information sent by the network device, where the indication information is used to instruct the terminal device to access the target cell; and the determining, by the terminal device, a target cell in the at least one cell based on the measurement report includes: determining, by the terminal device, the target cell in the at least one cell based on the indication information.

According to a second aspect, a wireless access method is provided. The method includes: determining, by a first network device, M pilots of N air interface technologies on a carrier, where each of the N air interface technologies corresponds to one of the M pilots, M and N are integers, N is greater than or equal to M, N is greater than or equal to 2, and M is greater than or equal to 1; and sending, by the first network device, the M pilots to a terminal device, where the M pilots are used to measure at least one cell. The first network device supports a plurality of air interface technologies on the carrier, the plurality of air interface technologies include the N air interface technologies, and the first network device may be a base station, a base station controller, or the like.

In this way, after determining the M pilots, the first network device sends information about the M pilots to the terminal device, so that the terminal device measures the at least one cell based on the information about the M pilots. The at least one cell may be a current serving cell of the terminal device or a neighboring cell of the terminal device. The N air interface technologies effectively use a radio resource by frequency division multiplexing one carrier. This can improve radio resource utilization. The plurality of air interface technologies may be supported on a same carrier, and a plurality of air interface technologies may be used to transmit a plurality of services whose QoS requirements are greatly different. Corresponding air interface technologies are provided based on different service requirements of the terminal device, and the first network device may dynamically allocate resources to the plurality of air interface technologies.

Optionally, the first network device sends measurement configuration information to at least one terminal device. The measurement configuration information is used by the at least one terminal device to measure at least one cell in a frequency range of an air interface technology supported by the at least one terminal device. The first network device supports N air interface technologies on a first carrier, and each of the at least one terminal device supports an air interface technology on the carrier, where N is greater than or equal to 2. The first network device receives a measurement report sent by the at least one terminal device after the at least one terminal device measures the at least one cell based on the measurement configuration information. The measurement report includes a result of the measurement performed by the at least one terminal device on the at least one cell in the frequency range of the air interface technology supported by the at least one terminal device. The first network device determines a target cell in the at least one cell based on the measurement report. The first network device sends access indication information to the at least one terminal device, and the access indication information is used to instruct the terminal device to access the target cell. That is, this embodiment of this application may further be applied to a case in which the first network device supports a plurality of air interface technologies on a carrier, the at least one terminal device supports an air interface technology on the carrier, and the air interface technology supported by the at least one terminal device occupies a carrier resource in a frequency division manner.

In a first possible implementation of the second aspect, after the sending, by the first network device, the M pilots to a terminal device, the method further includes: sending, by the first network device, first indication information to the terminal device, where the first indication information is used to instruct the terminal device to measure the at least one cell by using one of the M pilots in a same frequency range of a first air interface technology and a second air interface technology in the N air interface technologies, and a frequency range of the first air interface technology and a frequency range of the second air interface technology at least partially overlap.

In the technical solution of this application, the first indication information is used to instruct the terminal device to perform measurement by using one pilot in a same frequency range of two or more air interface technologies in the N air interface technologies, so that a target cell may be determined. Certainly, a first target cell may alternatively be determined by using a first pilot in a common frequency range of a first part of the N air interface technologies, and a second target cell may be determined in a common frequency range by using a second part of the N air interface technologies. The plurality of air interface technologies may access a same target cell, so that the plurality of air interface technologies in the same target cell support a plurality of services whose QoS requirements are greatly different, thereby improving radio resource utilization.

With reference to the foregoing possible implementation of the second aspect, in a second possible implementation of the second aspect, after the sending, by the first network device, the M pilots to a terminal device, the method further includes: sending, by the first network device, second indication information to the terminal device, where the second indication information indicates the terminal device to measure the at least one cell by separately using a first pilot and a second pilot in the M pilots in respective frequency ranges of a third air interface technology and a fourth air interface technology in the N air interface technologies, to generate a measurement report, and the frequency range of the third air interface technology and the frequency range of the fourth air interface technology at least partially do not overlap.

The second indication information is used to instruct the terminal device to perform measurement by using a pilot of each air interface technology, so that a plurality of target cells may be determined for the plurality of air interface technologies, thereby implementing mobility management of the plurality of air interface technologies.

With reference to the foregoing possible implementations of the second aspect, in a third possible implementation of the second aspect, before the sending, by the first network device, the M pilots to a terminal device, the method further includes: sending, by the first network device, air interface configuration information to the terminal device, where the air interface configuration information includes information instructing the terminal device to perform communication by using the N air interface technologies.

Based on the air interface configuration information sent by the network device to the terminal device, the terminal device may perform communication by using a particular air interface technology on the carrier based on the air interface configuration information, so that contention of the plurality of air interface technologies on the carrier for a resource can be avoided, thereby managing the resource.

Optionally, before the sending, by the first network device, the M pilots to a terminal device, the method further includes: sending, by the first network device, measurement configuration information to the terminal device. The measurement configuration information may include: identification information of the N air interface technologies, type information of the N air interface technologies, a pilot type and a frequency range corresponding to the pilot type, a criterion for reporting the measurement report (for example, a reference signal received power of a current cell is less than a preset threshold), a measurement period, a measurement time, a measurement interval during inter-frequency measurement, and the like.

With reference to the foregoing possible implementations of the second aspect, in a fourth possible implementation of the second aspect, after the sending, by the first network device, first indication information to the terminal device, the method further includes: receiving, by the first network device, the measurement report sent by the terminal device; determining, by the first network device, a target cell in the at least one cell based on the measurement report; and sending, by the first network device, third indication information to the terminal device, where the third indication information is used to instruct the terminal device to access the target cell.

With reference to the foregoing possible implementations of the second aspect, in a fifth possible implementation of the second aspect, the determining, by the first network device, a target cell in the at least one cell based on the measurement report includes: determining, by the first network device, the target cell based on the measurement report and an air interface technology type supported by the at least one cell, where there may be one or more target cells.

Optionally, the terminal device may carry the air interface type supported by the at least one cell in the measurement report when sending the measurement report to the first network device, and may determine the target cell based on the air interface type supported by the at least one cell and the measurement report.

In this way, during a process of determining the target cell by the network device, not only the measurement report is considered but also the air interface type supported by the at least one cell is considered. When determining, based on the measurement report, that two cells satisfy the condition at the same time, the network device determines the target cell by preferentially considering the cell supporting the N air interface technologies, so that when the terminal device accesses the target cell, the access of the target cell can support the N air interface technologies, thereby improving radio resource utilization.

With reference to the foregoing possible implementations of the second aspect, in a sixth possible implementation of the second aspect, before the sending, by the first network device, third indication information to the terminal device, the method further includes: sending, by the first network device, an access request message to a second network device serving the target cell, where the access request message is used by the terminal device to access the target cell, and the access request message carries types of the plurality of air interface technologies supported by the terminal device; and receiving, by the first network device, an acknowledgment message of the access request message that is sent by the second network device; and the sending, by the first network device, third indication information to the terminal device includes: sending, by the first network device, the third indication information to the terminal device based on the acknowledgment message of the access request.

According to a third aspect, a wireless access apparatus is provided. The apparatus is configured to perform the method according to the first aspect or any possible implementation of the first aspect. Specifically, the apparatus includes units configured to perform the method according to the first aspect or any possible implementation of the first aspect.

According to a fourth aspect, a wireless access apparatus is provided. The apparatus is configured to perform the method according to the second aspect or any possible implementation of the second aspect. Specifically, the apparatus includes units configured to perform the method according to the second aspect or any possible implementation of the second aspect.

According to a fifth aspect, a wireless access apparatus is provided. The apparatus includes: a receiver, a transmitter, a memory, a processor, and a bus system. The receiver, the transmitter, the memory, and the processor are connected by using the bus system. The memory is configured to store an instruction. The processor is configured to execute the instruction stored in the memory, to control the receiver to receive a signal and control the transmitter to send a signal. When the processor executes the instruction stored in the memory, the execution causes the processor to perform the method according to the first aspect or any possible implementation of the first aspect.

According to a sixth aspect, a wireless access apparatus is provided. The apparatus includes: a receiver, a transmitter, a memory, a processor, and a bus system. The receiver, the transmitter, the memory, and the processor are connected by using the bus system. The memory is configured to store an instruction. The processor is configured to execute the instruction stored in the memory, to control the receiver to receive a signal and control the transmitter to send a signal. When the processor executes the instruction stored in the memory, the execution causes the processor to perform the method according to the second aspect or any possible implementation of the second aspect.

According to a seventh aspect, a communications system is provided. The communications system includes the apparatus according to the fourth aspect.

According to an eighth aspect, a communications system is provided. The communications system includes the apparatus according to the third aspect and the apparatus according to the fourth aspect.

According to a ninth aspect, a system chip is provided. The system chip includes an input interface, an output interface, at least one processor, and a memory. The processor is configured to execute code in the memory, and when the code is executed, the processor implements the method according to the first aspect.

According to a tenth aspect, a system chip is provided. The system chip includes an input interface, an output interface, at least one processor, and a memory. The processor is configured to execute code in the memory, and when the code is executed, the processor implements the method according to the second aspect by invoking the input interface and the output interface.

According to an eleventh aspect, a computer readable medium is provided. The computer readable medium is configured to store a computer program. The computer program includes an instruction used to perform the method according to the first aspect or any possible implementation of the first aspect.

According to a twelfth aspect, a computer readable medium is provided. The computer readable medium is configured to store a computer program. The computer program includes an instruction used to perform the method according to the second aspect or any possible implementation of the second aspect.

DESCRIPTION OF EMBODIMENTS

It should be understood that, the technical solutions of the embodiments of this application may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplexing (FDD) system, LTE time division duplexing (TDD) system, a Universal Mobile Telecommunications System (UMTS), a Worldwide Interoperability for Microwave Access (WiMAX) communications system, a wireless local area network (WLAN), or a future fifth generation wireless communications system (the fifth generation, 5G).

Figure 1:
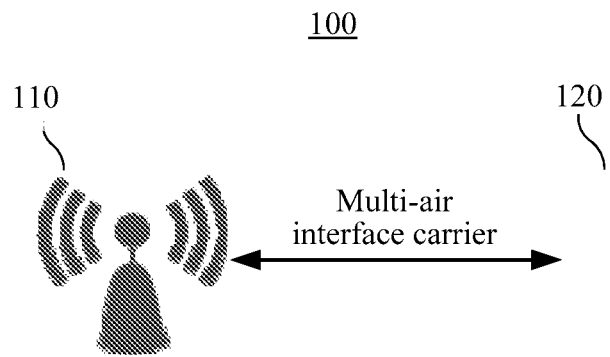
FIG. 1 is a schematic diagram of an application scenario according to an embodiment of this application.

FIG. 1 is a schematic diagram of a wireless communications system according to an embodiment of this application. The wireless communications system 100 may include a network device 110, and the network device 110 may be a device communicating with a terminal device. Each network device 100 may provide communications coverage for a particular geographic area, and may communicate with a terminal device (such as UE) within the coverage area. The network device 110 may be a base transceiver station (BTS) in a GSM system or a CDMA system, may be a NodeB (NB) in a WCDMA system, or may be an evolved NodeB (evolved node B, eNB or eNodeB) in an LTE system, or a wireless controller in a cloud radio access network (CRAN). Alternatively, the network device may be a relay node, an access point, an in-vehicle device, a wearable device, a network-side device in a future 5G network, a network device in a future evolved public land mobile network (PLMN), or the like.

The wireless communications system 100 further includes a plurality of terminal devices 120 within the coverage area of the network device 110. The terminal device 120 may be movable or fixed. The terminal device 120 may be an access terminal, user equipment (UE), a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, or another processing device connected to a wireless modem, an in-vehicle device, a wearable device, a terminal device in the future 5G network, a terminal device in the further evolved PLMN, or the like.

FIG. 1 shows one network device and one terminal device as an example. Optionally, the wireless communications system 100 may include a plurality of network devices, and a service range of each network device may include another quantity of terminal devices. This is not limited in this embodiment of this application.

Optionally, the wireless communications system 100 may further include another network entity such as a network controller or a mobility management entity. This is not limited in this embodiment of this application.

The wireless communications system 100 may support a plurality of air interface (AI) technologies, for example, different air interface technologies formed because one or more of the following aspects of the plurality of air interface technologies are different: a multiple access manner, a modulation and coding scheme (MCS), a frame structure, a physical channel, a transport channel, a logical channel, Media Access Control (MAC), Radio Link Control (RLC), the Packet Data Convergence Protocol (PDCP), Radio Resource Control (RRC), and the like.

The terminal device in this embodiment of this application supports a plurality of air interface technologies on a same carrier. The plurality of air interface technologies use a carrier resource by frequency division multiplexing. It should be understood that in this embodiment of this application, on a same carrier, different AIs may occupy different frequency ranges on the carrier in a frequency division manner, or occupy a same frequency range on the carrier in a time division manner, or occupy frequency ranges on the carrier in a frequency division and time division combination manner. For example, there is an overlapping area between the frequency ranges, and the carrier resource is occupied in a time division manner in the overlapping area. This is not limited in this embodiment of this application.

The wireless access method in this embodiment of this application is described below in detail with reference to FIG. 2 and FIG. 3.

Figure 2:
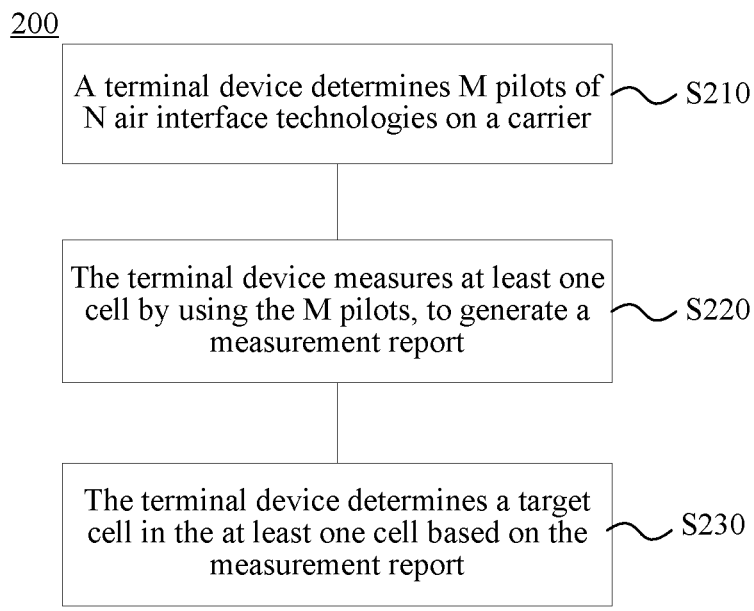
FIG. 2 is a schematic diagram of a wireless access method according to an embodiment of this application.

FIG. 2 shows a wireless access method 200 according to an embodiment of this application. The method is applied to a scenario in which a terminal device supports a plurality of air interface technologies on a carrier. In the method, an example in which communication is performed by using N air interface technologies of the plurality of air interface technologies supported by the terminal device is merely used for description. The method 200 includes the following steps.

S210. The terminal device determines M pilots of the N air interface technologies on the carrier, where each of the N air interface technologies corresponds to one of the M pilots, M and N are integers, N is greater than or equal to M, N is greater than or equal to 2, and M is greater than or equal to 1.

S220. The terminal device measures at least one cell by using the M pilots, to generate a measurement report.

S230. The terminal device determines a target cell in the at least one cell based on the measurement report.

Specifically, after determining the M pilots of the N air interface technologies, the terminal device measures the at least one cell of the terminal device by using the M pilots of the N air interface technologies, and determines one or more target cells in the at least one cell based on the measurement report. The terminal device may access the target cell from a current cell. The N air interface technologies effectively use a radio resource by frequency division multiplexing one carrier. A plurality of air interface technologies may be used to transmit a plurality of services whose QoS requirements are greatly different. Corresponding air interface technologies are provided based on different service requirements of the terminal device, and resources may be dynamically allocated to the plurality of air interface technologies.

Optionally, in S230, the terminal device determines the target cell based on a measurement report of any of the N air interface technologies; or the terminal device determines the target cell based on a measurement report of the air interface technology having a high priority; or the terminal device may determine the target cell based on measurement reports of some or all of the N air interface technologies. For example, a cell with a good wireless condition may be selected as the target cell based on the measurement report, or the target cell may be determined based on an air interface type supported by a cell. This is not limited in this embodiment of this application.

In an example, an example of a relationship between N and M is described in the following Table 1. If N is 3, M may be 1, 2, or 3. When M is 1, that is, in three air interface technologies, measurement is performed by using one pilot, the measurement may be performed by using the pilot in a common frequency range of the three air interface technologies, or the measurement may be performed by separately using the pilot in frequency ranges of the three air interface technologies. When M is 2, measurement may be performed by using a first pilot in a common frequency range of two of three air interface technologies or measurement is performed by separately using the first pilot in respective frequency ranges of the two air interface technologies, and measurement is performed by using a second pilot in a frequency range of a remaining air interface technology. When M is 3, measurement is performed by separately using a first pilot, a second pilot, and a third pilot in respective frequency ranges of three air interface technologies.

TABLE 1

| N | 3 | 3 | 3 |
|---|---|---|---|
| M | 1 | 2 | 3 |

In an optional embodiment, S220 may include: measuring, by the terminal device, the at least one cell by using one of the M pilots in a same frequency range of a first air interface technology and a second air interface technology in the N air interface technologies, to generate the measurement report, where a frequency range of the first air interface technology and a frequency range of the second air interface technology at least partially overlap, and the same frequency range includes a pilot applicable to the first air interface technology and the second air interface technology. That is, there are several common frequency ranges between some or all of the N air interface technologies, or the N air interface technologies may occupy a common frequency range, or some of the N air interface technologies may occupy several common frequency ranges. This is not limited in this embodiment of this application.

Specifically, measurement performed by using the N air interface technologies in the plurality of air interface technologies supported by the terminal device may be measurement performed in a common frequency range occupied by frequencies of the N air interface technologies. For example, the terminal device supports four air interface technologies, which are respectively an AI 1, an AI 2, an AI 3, and an AI 4. The AI 1 and the AI 2 have a corresponding common frequency range 1 and respective frequency ranges. The AI 3 and the AI 4 have a corresponding common frequency range 2 and respective frequency ranges. The terminal device may perform measurement by using a pilot 1 in the common frequency range 1. In a measurement result, a target cell 1 that the terminal device may access by using at least one of the AI 1 and the AI 2 is determined. The terminal device may perform measurement by using a pilot 2 of the AI 3 and the AI 4 in the common frequency range 2. In a measurement result, a target cell 2 that the terminal device may access by using at least one of the AI 3 and the AI 4 is determined. For another example, the AI 1, the AI 2, the AI 3, and the AI 4 have a corresponding common frequency range 3 and respective frequency ranges. Measurement is performed by using a pilot 3 in the common frequency range 3. In a measurement result, the target cell 1 that the terminal device may access by using at least one of the AI 1, the AI 2, the AI 3, and the AI 4 is determined. In a common frequency range, a target cell may be determined by using a pilot.

Optionally, the terminal device may measure the at least one cell based on first indication information sent by a network device, and the first indication information is used to instruct the terminal device to measure the at least one cell by using one of the M pilots in the same frequency range of the first air interface technology and the second air interface technology in the N air interface technologies. That is, the terminal device may perform the measurement in the same frequency range of the first air interface technology and the second air interface technology in the N air interface technologies based on the first indication information sent by the network device or a capability of the terminal device.

In an optional embodiment, S220 may further include: measuring, by the terminal device, the at least one cell by separately using a first pilot and a second pilot in the M pilots in respective frequency ranges of a third air interface technology and a fourth air interface technology in the N air interface technologies, to generate the measurement report, where the frequency range of the third air interface technology and the frequency range of the fourth air interface technology at least partially do not overlap. Optionally, the third air interface technology and the fourth air interface technology are different from the first air interface technology and the second air interface technology. That is, in the plurality of air interface technologies supported on the carrier, in some air interface technologies, measurement is performed by using a pilot in a common frequency range; and in some air interface technologies, measurement is performed by using a pilot in respective frequency ranges. A measure process is simplified by performing the measurement by using the pilot in the common frequency range, and at least one target cell may be determined by performing the measurement in the respective frequency ranges of the air interface technologies, thereby managing mobility of the plurality of air interface technologies.

Specifically, measurement performed by using the N air interface technologies in the plurality of air interface technologies supported by the terminal device may be measurement performed in a common frequency range occupied by frequencies of the N air interface technologies. For example, the terminal device supports four air interface technologies, which are respectively an AI 1, an AI 2, an AI 3, and an AI 4. The terminal device performs measurement by separately using a pilot 1, a pilot 2, a pilot 3, and a pilot 4 in respective frequency ranges (a frequency range 1, a frequency range 2, a frequency range 3, and a frequency range 4) of the AI 1, the AI 2, the AI 3, and the AI 4. In a measurement result, a target cell 1 that the terminal device may access by using at least one of the AI 1, the AI 2, the AI 3, and the AI 4 is determined. For another example, the AI 1 and the AI 2 have a common frequency range 1, and the AI 3 and the AI 4 do not have a common frequency range. The terminal device may perform measurement by using a pilot 5 in the common frequency range 1. In a measurement result, a target cell 2 that the terminal device may access by using at least one of the AI 1 and the AI 2 is determined. The terminal device performs measurement by using a pilot 6 in the frequency range of the AI 3. In a measurement result, a target cell 3 that the terminal device may access by using the AI 3 is determined. The terminal device performs measurement by using a pilot 7 in the frequency range of the AI 4. In a measurement result, a target cell 4 that the terminal device may access by using the AI 4 is determined. That is, the terminal device may simultaneously access the target cell 2, the target cell 3, and the target cell 4 by using different air interface technologies. This is not limited in this embodiment of this application.

Optionally, the terminal device may measure the at least one cell based on second indication information sent by the network device, and the second indication information is used to instruct the terminal device to measure the at least one cell by separately using the first pilot and the second pilot in the M pilots in the respective frequency ranges of the third air interface technology and the fourth air interface technology in the N air interface technologies, to generate the measurement report. The frequency range of the third air interface technology and the frequency range of the fourth air interface technology at least partially do not overlap. That is, the terminal device may perform the measurement in the respective frequency ranges of the third air interface technology and the fourth air interface technology in the N air interface technologies based on the second indication information sent by the network device or the capability of the terminal device.

In an optional embodiment, S210 may include: receiving, by the terminal device, a system message of the at least one cell; and determining, by the terminal device, the M pilots of the N air interface technologies on the carrier based on the system message.

Optionally, the system information is used by the terminal device to obtain the air interface technology and configuration information of the pilot on the carrier. The system information includes: the N air interface technologies supported on the carrier, information about the M pilots corresponding to the N air interface technologies, priority information (which may alternatively be pre-stipulated by the network device) of the N air interface technologies, and the like. The terminal device may determine the M pilots based on pilots corresponding to the N air interface technologies supported on the carrier, and determine a pilot corresponding to information related to the N air interface technologies based on the information related to the N air interface technologies in the system message. The information included in the system message is not limited in this embodiment of this application.

It should be understood that the system information may be sent by the network device to the terminal device when the terminal device is in a connected state, or may be sent by the network device to the terminal device when the terminal device is in an idle state. This is not limited in this embodiment of this application. When the terminal device is in the connected state, the network device may further send the air interface technology and the configuration information of the pilot to the terminal device by using dedicated RRC signaling. The dedicated RRC signaling means that the RRC signaling is only sent to the terminal device.

It should be understood that the system message may be sent in a current cell on which the terminal device is camped or a neighboring cell of the terminal device. The terminal device may periodically detect the information about the M pilots that is carried in the system message. This is not limited in this embodiment of this application.

In an optional embodiment, before S210, the method 200 further includes: receiving, by the terminal device, air interface configuration information sent by the network device, where the air interface configuration information includes information instructing the terminal device to perform communication by using the N air interface technologies and the M pilots of the N air interface technologies. S210 may include: determining, by the terminal device, the M pilots of the N air interface technologies based on the air interface configuration information. For example, the terminal device supports five air interface technologies. Before the terminal device performs measurement, the network device needs to send air interface configuration information to the terminal device. For example, the terminal device may be set to communicate with the network device by using three of the five air interface technologies supported by the terminal device.

Optionally, the terminal device may further receive measurement configuration information sent by the network device, so that the terminal device performs measurement based on the measurement configuration information. The measurement configuration information may include: identification information of the N air interface technologies, type information of the N air interface technologies, a pilot type and a frequency range corresponding to the pilot type, a criterion for reporting the measurement report (for example, a reference signal received power of the current cell is less than a preset threshold), a measurement period, a measurement time, a measurement interval during inter-frequency measurement, and the like. This is not limited in this embodiment of this application. The air interface configuration information and the measurement configuration information may be separately sent to the terminal device or may be sent to the terminal device together. This is not limited in this embodiment of this application.

Optionally, the terminal device may alternatively determine the pilot without depending on the system information and the air interface configuration information that is sent by the network device but scan a synchronization channel on the carrier based on the air interface type supported by the terminal device, and determine the M pilots based on information about the synchronization channel. A relationship between the synchronization channel and the pilot may be predetermined. For example, the relationship between the synchronization channel and the pilot may be set in the terminal device at delivery of the terminal device. This is not limited in this embodiment of this application.

In an optional embodiment, S230 may include: determining, by the terminal device, the target cell in the at least one cell based on a measurement report of any of the N air interface technologies. If the terminal device supports five air interface technologies, for example, the target cell may be determined based on at least one measurement result obtained through measurement that is performed by using a pilot of any of the five air interface technologies. For example, when the terminal device is in the idle state, the target cell may be determined by using a cell selection criterion. The cell selection criterion satisfies a C1 criterion and a C2 criterion. For example, in the C1 criterion, a value of C1 is greater than zero. In the C2 criterion, a cell having a maximum value of C2 is used as a reselected cell. C1=RLA_C−RXLEV_ACCESS_MIN−MAX ((MS_TXPWR_MAX_CCH−P), 0), where RLA_C represents an average level of a cell (which represents a signal strength of the cell) received by a mobile terminal, RXLEV_ACCESS_MIN represents a minimum level (a minimum allowance value) of that the cell that allows mobile terminal to access, MS_TXPWR_MAX_CCH represents a maximum transmit power level that can be used by the mobile terminal when the mobile terminal accesses the cell, and P represents a maximum output power of the mobile terminal. That is, when in at least one neighboring cell of the current camped-on cell, the neighboring cell satisfying that the value of C1 is greater than zero may be considered as satisfying the C1 criterion. C2=C1+/−CELL_RESELECT_OFFSET (a cell reselection offset). The terminal device uses the neighboring cell satisfying that the value of C1 is greater than 0 and the value of C2 is the maximum in the neighboring cell of the current camped-on cell as the target cell.

In an optional embodiment, before S230, the method 200 may include: determining, by the terminal device, a priority order of the N air interface technologies. S230 may include: determining, by the terminal device, the target cell in the at least one cell based on the priority order of the N air interface technologies and the measurement report of the air interface that is determined based on the priority order. For example, the N air interface technologies arranged in a priority descending order are: the first air interface technology, the second air interface technology, . . . , and an $N^{th}$ air interface technology. A cell may be determined based on a measurement report of the first air interface technology. If the cell determined based on the measurement report of the first air interface technology supports the N air interface technologies, the cell determined based on the measurement report of the first air interface technology may be used as the target cell. If the cell determined based on the measurement report of the first air interface technology does not support the second air interface technology, and a cell determined based on a measurement report of the second air interface technology supports the N air interface technologies, the cell determined based on the measurement report of the second air interface technology may be used as the target cell that the terminal device accesses. This is not limited in this embodiment of this application.

In an optional embodiment, before S230, the method 200 may further include: sending, by the terminal device, the measurement report to the network device, so that the network device determines the target cell in the at least one cell based on the measurement report; and receiving, by the terminal device, indication information sent by the network device, where the indication information is used to instruct the terminal device to access the target cell. S230 may include: determining, by the terminal device, the target cell in the at least one cell based on the indication information.

That is, the terminal device may determine the target cell, or may determine the target cell by receiving the indication information of the target cell that is determined by the network device. This is not limited in this embodiment of this application.

It should be understood that determining, by the terminal device, the target cell of the N air interface technologies in the at least one cell may be determining a target cell for the N air interface technologies, or may be determining N target cells for the N air interface technologies, or may be determining less than N target cells for the N air interface technologies. It should be further understood that the determined one or more target cells may be a cell served by a base station or a cell served by different base stations. For example, three target cells may be: three target cells served by one base station, or three target cells served by two base stations, or three target cells served by three base stations. This is not limited in this embodiment of this application.

Optionally, when the terminal device is in the idle state, after the terminal device determines the target cell in the at least one cell based on the indication information, the terminal device may reselect the target cell from the current camped-on cell. When the terminal device is in a data connected state, the terminal device may switch from the current cell to the target cell based on the indication information, so that reselection or switching of the plurality of air interface technologies may be implemented on the carrier, thereby improving radio resource utilization.

Therefore, in the wireless access method provided in this embodiment of this application, after determining the M pilots of the N air interface technologies by receiving the system message or receiving the M pilots sent by the network device, the terminal device may measure the at least one cell by using the M pilots in M common frequencies of the N air interface technologies or measure the at least one cell by using one of the M pilots in respective frequency ranges of the N air interface technologies, to generate a measurement report, and determine one or more target cells in the at least one cell based on the measurement report. The terminal device may access the target cell from the current cell. The terminal device may alternatively determine a target cell by performing measurement by using a pilot in a common frequency range for some of the plurality of air interface technologies, and may determine several target cells by performing measurement by using respective pilots in respective frequency ranges for remaining air interface technologies of the plurality of air interface technologies. In this way, the N air interface technologies effectively use a radio resource by frequency division multiplexing one carrier. A plurality of air interface technologies may be used to transmit a plurality of services whose QoS requirements are greatly different. Corresponding air interface technologies are provided based on different service requirements of the terminal device, and resources may be dynamically allocated to the plurality of air interface technologies.

Figure 3:
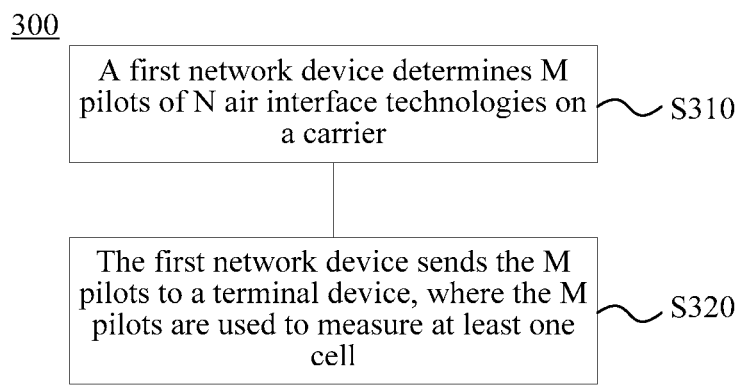
FIG. 3 is a schematic diagram of another wireless access method according to an embodiment of this application.

FIG. 3 shows a wireless access method 300 according to an embodiment of this application. The method is applied to a scenario in which a terminal device and a first network device support a plurality of air interface technologies on a carrier. The first network device may be the network device 110 in FIG. 1. In the method 300, an example in which communication is performed by using N air interface technologies of the plurality of air interface technologies supported on the carrier is merely used for description. The method 300 includes the following steps.

S310. The first network device determines M pilots of the N air interface technologies on the carrier, where each of the N air interface technologies corresponds to one of the M pilots, M and N are integers, N is greater than or equal to M, N is greater than or equal to 2, and M is greater than or equal to 1.

S320. The first network device sends the M pilots to the terminal device, where the M pilots are used to measure at least one cell.

Specifically, that the first network device determines the M pilots of the N air interface technologies on the carrier may be that the first network device configures a correspondence between the M pilots and the N air interfaces. For example, measurement is performed by using a pilot 1 in a common frequency range between an AI 1 and an AI 2, and measurement is performed by using a pilot 2 in a frequency range of an AI 3. This is not limited in this embodiment of this application.

It should be understood that when the terminal device is in a data connected state, the first network device sends the M pilots to the terminal device, and the terminal device receives the M pilots. When the terminal device is in an idle state, the first network device sends the M pilots to the terminal device in a form of a broadcast system message, the terminal device periodically scans the system message, and obtains the M pilots based on the system message.

In an optional embodiment, after S320, the method 300 further includes: sending, by the first network device, first indication information to the terminal device, where the first indication information is used to instruct the terminal device to measure the at least one cell by using one of the M pilots in a same frequency range of a first air interface technology and a second air interface technology in the N air interface technologies, and a frequency range of the first air interface technology and a frequency range of the second air interface technology at least partially overlap.

It should be understood that the foregoing same frequency range may be allocated by the first network device to the terminal device. The same frequency range may be a same frequency band occupied by the N air interface technologies and may be referred to as a common frequency range. The first network device determines the common frequency range based on features of the N air interface technologies. The feature of the air interface technology includes: a waveform, a multiple access manner, a frame structure dimension, a frame structure type, frame structure uplink and downlink configurations, and the like. For example, the first network device sets one common frequency range for a plurality of air interface technologies using a same waveform, a same multiple access manner, and different frame structure dimensions. For another example, the first network device sets one or more common frequency ranges for a plurality of air interface technologies using a same waveform, a same multiple access manner, a same frame structure dimension, and different frame structure uplink and downlink configurations, or the like. The setting of the common frequency range is not limited in this embodiment of this application.

Optionally, a configuration of the same frequency range of the first air interface technology and the second air interface technology may be sent by the first network device to the terminal device. Alternatively, the same frequency range may be determined based on frequency ranges of the first air interface technology and the second air interface technology that are supported by the terminal device. This is not limited in this embodiment of this application.

In an optional embodiment, after S320, the method 300 further includes: sending, by the first network device, second indication information to the terminal device, where the second indication information is used to instruct the terminal device to measure the at least one cell by separately using a first pilot and a second pilot in the M pilots in respective frequency ranges of a third air interface technology and a fourth air interface technology in the N air interface technologies, to generate a measurement report, and the frequency range of the third air interface technology and the frequency range of the fourth air interface technology at least partially do not overlap.

It should be understood that the first indication information and the second the indication information may be sent to the terminal device in a same message. For example, the first indication information and the second the indication information may be carried in the M pilots sent by the first network device to the terminal device. Alternatively, the first indication information and the second the indication information may be carried in air interface configuration information sent by the network device to the terminal device. Alternatively, the first indication information and the second the indication information may be separately sent to the terminal device. This is not limited in this embodiment of this application.

In an optional embodiment, before S320, the method 300 further includes: sending, by the first network device, air interface configuration information to the terminal device, where the air interface configuration information includes information instructing the terminal device to perform communication by using the N air interface technologies. The air interface configuration information includes the information instructing the terminal device to perform communication by using the N air interface technologies and the M pilots of the N air interface technologies. The M pilots are used by the terminal device to measure the at least one cell. If the terminal device can support four air interface technologies on the carrier, the first network device may configure three air interface technologies for the terminal device to perform communication, and may configure one pilot for the three air interface technologies, so that a target cell is determined; or may configure three pilots for the three air interface technologies, so that three target cells are determined, and the like.

Optionally, the first network device may further send measurement configuration information to the network device, so that the terminal device performs measurement based on the measurement configuration information. The measurement configuration information is used by the terminal device to measure the at least one cell of the terminal device. The measurement configuration information may further include: identification information of the N air interface technologies, type information of the N air interface technologies, a pilot type and a frequency range corresponding to the pilot type, a criterion for reporting the measurement report (for example, a reference signal received power of a current cell is less than a preset threshold), a measurement period, a measurement time, a measurement interval during inter-frequency measurement, and the like. This is not limited in this embodiment of this application.

In an optional embodiment, before S320, the method 300 further includes: receiving, by the first network device, the measurement report sent by the terminal device; determining, by the first network device, a target cell in the at least one cell based on the measurement report; and sending, by the first network device, third indication information to the terminal device, where the third indication information is used to instruct the terminal device to access the target cell.

It should be understood that determining, by the first network device, the target cell of the N air interface technologies in the at least one cell based on the measurement report may be determining a target cell for the N air interface technologies, or may be determining N target cells for the N air interface technologies, or may be determining less than N target cells for the N air interface technologies. It should be further understood that the one or more target cells determined by the first network device may be a cell served by a network device or a cell served by different network devices. For example, three target cells may be: three target cells served by one base station, or three target cells served by two base stations, or three target cells served by three target base stations. This is not limited in this embodiment of this application.

Optionally, the terminal device may report the measurement report to the first network device when a particular condition of the prior art is satisfied. For example, when the terminal device detects that a reference signal receiving power (RSRP) of a serving cell is less than a preset threshold or an RSRP of a neighboring cell of the cell, the terminal device sends the measurement report to the first network device; or the terminal device periodically reports the measurement report to the first network device. A condition for reporting the measurement report is not limited in this embodiment of this application.

In an optional embodiment, the determining, by the first network device, a target cell in the at least one cell based on the measurement report includes: determining, by the first network device, the target cell based on the measurement report and an air interface technology type supported by the at least one cell.

Specifically, if the terminal device supports an AI 1 and an AI 2, the first network device determines that measurement results of two target cells both satisfy a preset condition. Optionally, both the two target cells may be used as the target cell. Optionally, if one of the target cells supports only the AI 1, the other one of the target cells simultaneously provides the AI 1 and the AI 2, and a wireless condition of the former one is higher than that of the latter one, the first network device may determine to select a cell with a best wireless condition as the target cell. Optionally, any one of the two target cells may alternatively be selected as the target cell, that is, the first network device may determine the target cell based on the measurement report and/or the air interface type supported by the at least one cell. A method for determining the target cell is not limited in this embodiment of this application.

In an optional embodiment, before the sending, by the first network device, third indication information to the terminal device, the method 300 further includes: sending, by the first network device, an access request message to a second network device serving the target cell, where the access request message is used by the terminal device to access the target cell, and the access request message carries types of the plurality of air interface technologies supported by the terminal device; and receiving, by the first network device, an acknowledgment message of the access request message that is sent by the second network device; and the sending, by the first network device, third indication information to the terminal device includes: sending, by the first network device, the third indication information to the terminal device based on the acknowledgment message of the access request.

Optionally, before the first network device determines the target cell, information exchanged between the first network device and the second network device may include: configuration information of the plurality of air interfaces, configuration information of the frequency range, and information about the air interface technology occupied by the current carrier, and the like.

It should be understood that there may be one or more pieces of third indication information. One piece of access indication information is used to instruct to access one target cell. Certainly, if the first network device determines M different target cells, the third indication information may be indication information sent to the M different target cells. This is not limited in this embodiment of this application.

Optionally, when the terminal device is in a network data connected state, the third indication information may be switching indication information. The switching indication information instructs the terminal device to switch to the target cell. The terminal device switches to the target cell based on the switching indication information. In this way, the terminal device supports switching between the plurality of air interface technologies on the carrier.

Therefore, in the wireless access method provided in this embodiment of this application, the plurality of air interface technologies are supported on the carrier. The first network device sends the air interface configuration information to the terminal device, so that the terminal device measures the at least one cell of the terminal device based on the air interface configuration information. The terminal device measures the at least one cell based on the air interface configuration information, and sends the measurement report to the first network device. The first network device determines the target cell in the at least one cell based on the measurement report, and sends the access request message for the plurality of air interface technologies to the second network device. When determining, based on capability information of the second network device, that the second network device can accept access of the air interface technologies, the second network device sends the acknowledgment message of the access request message to the first network device. When receiving the acknowledgment message, the first network device sends the third indication information to the terminal device, to instruct the terminal device to access the target cell by using the air interface technologies. The terminal device accesses the target cell based on the third indication information. Therefore, access of the terminal device by using the plurality of air interface technologies on the same carrier can be implemented, thereby improving radio resource utilization.

Optionally, the first network device sends measurement configuration information to at least one terminal device. The measurement configuration information is used by the at least one terminal device to measure at least one cell in a frequency range of an air interface technology supported by the at least one terminal device. The first network device supports N air interface technologies on a first carrier, and each of the at least one terminal device supports an air interface technology on the carrier, where N is greater than or equal to 2. The first network device receives a measurement report sent by the at least one terminal device after the at least one terminal device measures the at least one cell based on the measurement configuration information. The measurement report includes a result of the measurement performed by the at least one terminal device on the at least one cell in the frequency range of the air interface technology supported by the at least one terminal device. The first network device determines a target cell in the at least one cell based on the measurement report. The first network device sends access indication information to the at least one terminal device, and the access indication information is used to instruct the terminal device to access the target cell.

That is, this embodiment of this application may further be applied to a case in which the first network device supports a plurality of air interface technologies on a carrier, the at least one terminal device supports an air interface technology on the carrier, and the air interface technology supported by the at least one terminal device occupies a carrier resource in a frequency division manner.

Optionally, if the terminal device supports communication using N air interface technologies on a carrier, the N air interface technologies are in a data connected state, and N is greater than 2, the terminal device may measure a neighboring cell of the terminal device and a current serving cell by using the N air interface technologies by receiving air interface configuration information sent by the first network device, and send a measurement report to the first network device. After the first network device determines a target cell in the neighboring cell and the current serving the cell, the terminal device switches to the target cell based on switching indication information.

Optionally, if the terminal device supports communication using N air interface technologies on a carrier, the N air interface technologies are in an idle state, and N is greater than 2, the terminal device proactively scans a system message of at least one cell by using the N air interface technologies, to determine whether a frequency and a measurement pilot that correspond to N-P air interface technologies are included in the system message. When finding the frequency and the measurement pilot that correspond to the N-P air interface technologies, the terminal device determines a target camped-on cell in the at least one cell by using the measurement pilot. The terminal device reselects the target camped-on cell from a current camped-on cell.

Optionally, if P air interface technologies in N air interface technologies used for communication performed by the terminal device on a carrier are in a data connected state, and N-P air interface technologies are in an idle state, P is a positive integer greater than or equal to 1, and N is greater than 2, the terminal device may measure at least one cell of the terminal device by using the P air interface technologies by receiving air interface configuration information sent by the first network device, and send a measurement report to the first network device. After the first network device determines a target cell, the terminal device is switched, based on switching indication information, to the target cell by using the P air interface technologies. The terminal device proactively scans a system message of the at least one cell by using the N-P air interface technologies, to determine whether a frequency and a measurement pilot that correspond to the N-P air interface technologies are included in the system message. When finding the frequency and the measurement pilot that correspond to the N-P air interface technologies, the terminal device determines a target camped-on cell in the at least one cell by using the measurement pilot, and the terminal device reselects the target camped-on cell from a current camped-on cell by using the N-P air interface technologies.

Figure 4:
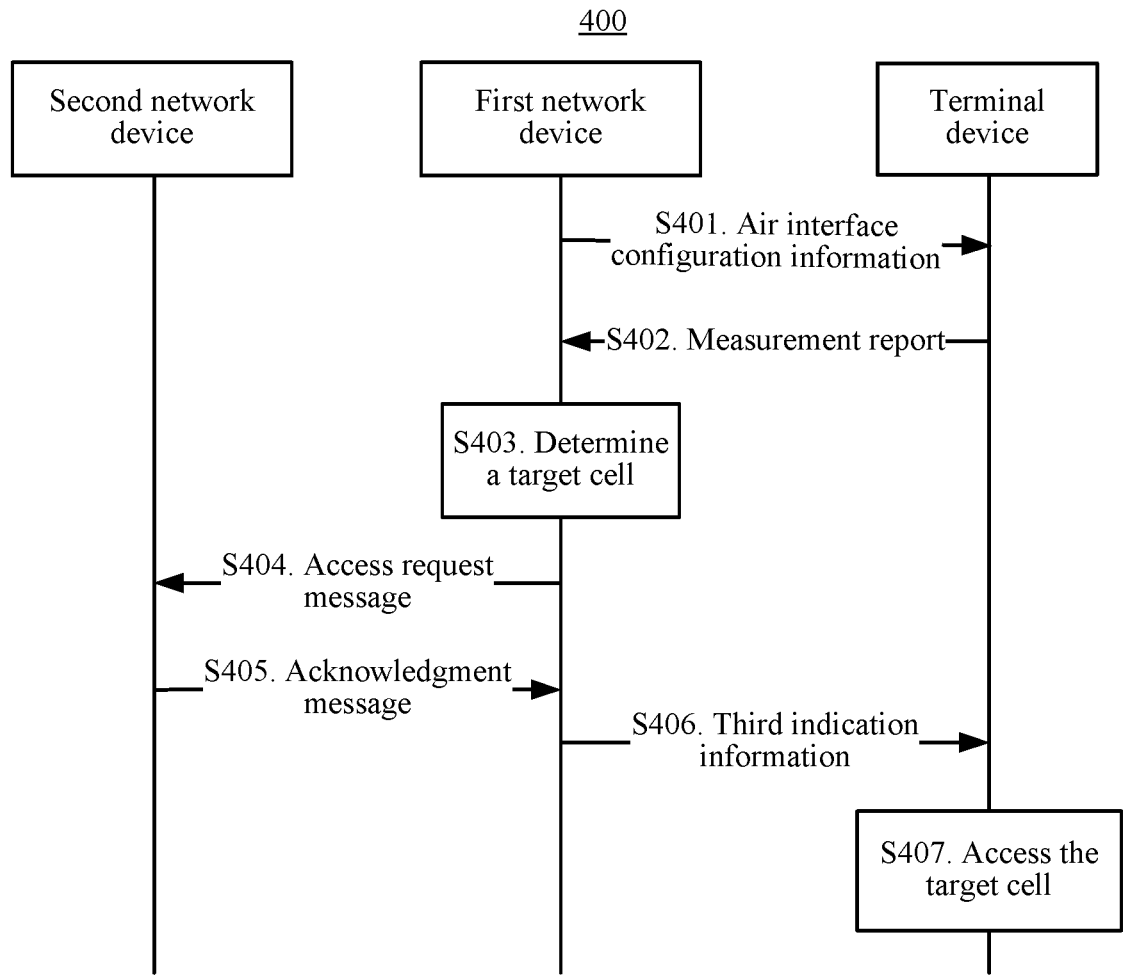
FIG. 4 is a schematic diagram of still another wireless access method according to an embodiment of this application.

In an example, as shown in FIG. 4, a wireless access method 400 may include the following steps.

S401. A first network device sends air interface configuration information to a terminal device, where the air interface configuration information includes information instructing the terminal device to perform communication by using the N air interface technologies and M pilots of the N air interface technologies, so that the terminal device measures at least one cell of the terminal device based on the air interface configuration information.

S402. The terminal device measures the at least one cell based on the air interface configuration information, and sends a measurement report to the first network device.

S403. The first network device determines a target cell in the at least one cell for the N air interface technologies based on the measurement report.

S404. The first network device sends an access request message for the N air interface technologies to a second network device, where the second network device serves the target cell.

Optionally, there may be one or more second network devices. This is not limited in this embodiment of this application.

S405. After receiving the access request message, the second network device determines to accept access of the N air interface technologies based on capability information of the second network device, and sends an acknowledgment message of the access request message to the first network device.

S406. After receiving the acknowledgment message sent by the second network device, the first network device sends third indication information to the terminal device.

S407. The terminal device accesses the target cell based on the third indication information.

Therefore, in the wireless access method provided in this embodiment of this application, the terminal device supports a plurality of air interface technologies on a carrier. The first network device first sends air interface configuration information to the terminal device, so that the terminal device measures the at least one cell of the terminal device based on the air interface configuration information. The terminal device measures the at least one cell based on the air interface configuration information, and sends a measurement report to the first network device. The first network device determines a target cell for the plurality of air interface technologies based on the measurement report, and sends an access request message for the plurality of air interface technologies to the second network device. When determining, based on the capability information of the second network device, that the second network device can accept access of the air interface technologies, the second network device sends an acknowledgment message of the access request message to the first network device. When receiving the acknowledgment message, the first network device sends access indication information to the terminal device, to instruct the terminal device to access the target cell by using the air interface technologies. The terminal device accesses the target cell based on the indication information. Therefore, access of the terminal device by using the plurality of air interface technologies on the same carrier can be implemented, thereby improving radio resource utilization.

It should be noted that, sequence numbers of the foregoing processes do not indicate an execution sequence, and an execution sequence of processes shall be determined based functions and internal logic thereof, and shall constitute no limitation on an implementation process of the embodiments of this application.

The wireless access methods according to the embodiments of this application are described above in detail with reference to FIG. 2 to FIG. 4, and wireless access apparatuses according to embodiments of this application are described below in detail with reference to FIG. 5 to FIG. 8.

Figure 5:
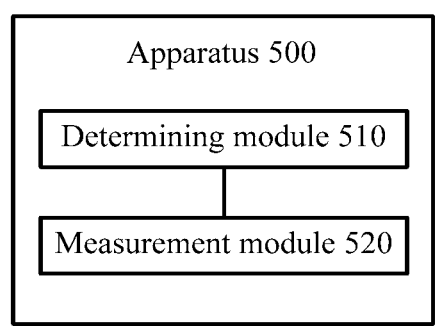
FIG. 5 is a schematic diagram of a wireless access apparatus according to an embodiment of this application.

FIG. 5 shows a wireless access apparatus 500 according to an embodiment of this application. The apparatus 500 may be a network device, and the apparatus 500 includes:

a determining module 510, configured to determine M pilots of N air interface technologies on a carrier, where each of the N air interface technologies corresponds to one of the M pilots, M and N are integers, N is greater than or equal to M, N is greater than or equal to 2, and M is greater than or equal to 1; and a measurement module 520, configured to measure at least one cell by using the M pilots, to generate a measurement report, where the determining module 510 is further configured to determine a target cell in the at least one cell based on the measurement report.

Specifically, after determining the M pilots of the N air interface technologies, the determining module measures the at least one cell of a terminal device by using the M pilots of the N air interface technologies, and determines one or more target cells in the at least one cell based on the measurement report. The apparatus 500 may access the target cell from a current cell. The N air interface technologies effectively use a radio resource by frequency division multiplexing one carrier. A plurality of air interface technologies may be used to transmit a plurality of services whose QoS requirements are greatly different. Corresponding air interface technologies are provided based on different service requirements of the terminal device, and resources may be dynamically allocated to the plurality of air interface technologies.

In an optional embodiment, the measurement module 520 is specifically configured to measure the at least one cell by using one of the M pilots in a same frequency range of a first air interface technology and a second air interface technology in the N air interface technologies, to generate the measurement report. A frequency range of the first air interface technology and a frequency range of the second air interface technology at least partially overlap.

In an optional embodiment, the measurement module 520 is specifically further configured to measure the at least one cell by separately using a first pilot and a second pilot in the M pilots in respective frequency ranges of a third air interface technology and a fourth air interface technology in the N air interface technologies, to generate the measurement report. The frequency range of the third air interface technology and the frequency range of the fourth air interface technology at least partially do not overlap.

In an optional embodiment, the apparatus 500 further includes: a first receiving module, configured to: before determining the M pilots of the N air interface technologies on the carrier, receive a system message of the at least one cell. The determining module 510 is specifically configured to determine the M pilots of the N air interface technologies on the carrier based on the system message.

In an optional embodiment, the apparatus 500 further includes: a second receiving module, configured to: before determining the M pilots of the N air interface technologies on the carrier, receive air interface configuration information sent by a network device. The air interface configuration information includes information instructing the terminal device to perform communication by using the N air interface technologies and the M pilots of the N air interface technologies. The determining module 510 is specifically configured to determine the M pilots of the N air interface technologies based on the air interface configuration information.

In an optional embodiment, the determining module 510 is specifically further configured to determine the target cell in the at least one cell based on a measurement report of any of the N air interface technologies.

In an optional embodiment, the determining module 510 is specifically further configured to: before determining the target cell in the at least one cell based on the measurement report, determine a priority order of the N air interface technologies, and determine the target cell in the at least one cell based on the priority order of the N air interface technologies and the measurement report.

In an optional embodiment, the apparatus 500 further includes: a sending module, configured to: before determining the target cell in the at least one cell based on the measurement report, send the measurement report to the network device, so that the network device determines the target cell in the at least one cell based on the measurement report; and a third receiving module, configured to receive indication information sent by the network device. The indication information is used to instruct the terminal device to access the target cell. The determining module 510 is specifically configured to determine the target cell in the at least one cell based on the indication information.

Therefore, after determining the M pilots of the N air interface technologies by receiving the system message or receiving the M pilots sent by the network device, the wireless access apparatus provided in this embodiment of this application may measure the at least one cell by using the M pilots in a common frequency of the N air interface technologies or measure the at least one cell by using one of the M pilots in respective frequency ranges of the N air interface technologies, to generate a measurement report, and determine one or more target cells in the at least one cell based on the measurement report. The apparatus may access the target cell from a current cell. The apparatus may alternatively determine a target cell by performing measurement by using a pilot in a common frequency range for some of the plurality of air interface technologies, and may determine several target cells by performing measurement by using respective pilots in respective frequency ranges for remaining air interface technologies of the plurality of air interface technologies. In this way, the N air interface technologies effectively use a radio resource by frequency division multiplexing one carrier. A plurality of air interface technologies may be used to transmit a plurality of services whose QoS requirements are greatly different. Corresponding air interface technologies are provided based on different service requirements, and resources may be dynamically allocated to the plurality of air interface technologies.

It should be understood that the apparatus 500 herein is represented in a form of a functional module. The term "module" herein may be an application-specific integrated circuit (ASIC), an electronic circuit, a processor (such as a shared processor, a dedicated processor, or a processor group) configured to execute one or more software or firmware programs, a memory, a combinational logic circuit, and/or another appropriate component supporting the described function. In an optional example, a person skilled in the art may understand that the apparatus 500 may be the terminal device in the foregoing embodiments, and the apparatus 500 may be configured to perform the procedures and/or steps corresponding to the terminal device in the foregoing method embodiments. To avoid repetition, details are not described herein again.

Figure 6:
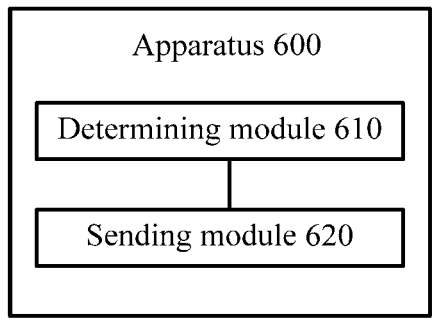
FIG. 6 is a schematic diagram of another wireless access apparatus according to an embodiment of this application.

FIG. 6 shows a wireless access apparatus 600 according to an embodiment of this application. The apparatus 600 may be a network device, and the apparatus 600 includes:

a determining module 610, configured to determine M pilots of N air interface technologies on a carrier, where each of the N air interface technologies corresponds to one of the M pilots, M and N are integers, N is greater than or equal to M, N is greater than or equal to 2, and M is greater than or equal to 1; and a sending module 620, configured to send the M pilots to a terminal device, where the M pilots are used to measure at least one cell.

In an optional embodiment, the sending module 620 is further configured to: after sending the M pilots to the terminal device, send first indication information to the terminal device. The first indication information is used to instruct the terminal device to measure the at least one cell by using one of the M pilots in a same frequency range of a first air interface technology and a second air interface technology in the N air interface technologies, to generate a measurement report. A frequency range of the first air interface technology and a frequency range of the second air interface technology at least partially overlap.

In an optional embodiment, the sending module 620 is further configured to: after sending the M pilots to the terminal device, send second indication information to the terminal device. The second indication information is used to instruct the terminal device to measure the at least one cell by separately using a first pilot and a second pilot in the M pilots in respective frequency ranges of a third air interface technology and a fourth air interface technology in the N air interface technologies, to generate a measurement report, and the frequency range of the third air interface technology and the frequency range of the fourth air interface technology at least partially do not overlap.

In an optional embodiment, the sending module 620 is further configured to: before sending the M pilots to the terminal device, send air interface configuration information to the terminal device. The air interface configuration information includes information instructing the terminal device to perform communication by using the N air interface technologies.

In an optional embodiment, the apparatus 600 further includes: a receiving module, configured to: after sending the first indication information to the terminal device, receive the measurement report sent by the terminal device. The determining module 610 is further configured to determine a target cell in the at least one cell based on the measurement report. The sending module 620 is further configured to send third indication information to the terminal device, and the third indication information is used to instruct the terminal device to access the target cell.

In an optional embodiment, the determining module 610 is further configured to determine the target cell based on the measurement report and an air interface technology type supported by the at least one cell.

In an optional embodiment, the sending module 620 is further configured to: before sending the third indication information to the terminal device, send an access request message to a second network device serving the target cell. The access request message is used by the terminal device to access the target cell, and the access request message carries types of a plurality of air interface technologies supported by the terminal device. The receiving module is further configured to receive an acknowledgment message of the access request message that is sent by the second network device. The sending module 620 is configured to send the third indication information to the terminal device based on the acknowledgment message of the access request.

Therefore, the wireless access apparatus provided in this embodiment of this application supports the plurality of air interface technologies on the carrier. The apparatus sends the air interface configuration information to the terminal device, so that the terminal device measures the at least one cell of the terminal device based on the air interface configuration information. The terminal device measures the at least one cell based on the air interface configuration information, and sends the measurement report to the apparatus. The apparatus determines the target cell in the at least one cell based on the measurement report, and sends the access request message for the plurality of air interface technologies to the second network device. When determining, based on capability information of the second network device, that the second network device can accept access of the air interface technologies, the second network device sends the acknowledgment message of the access request message to the first network device. When receiving the acknowledgment message, the apparatus sends the third indication information to the terminal device, to instruct the terminal device to access the target cell by using the air interface technologies. The terminal device accesses the target cell based on the third indication information. Therefore, access of the terminal device by using the plurality of air interface technologies on the same carrier can be implemented, thereby improving radio resource utilization.

It should be understood that the apparatus 600 herein is represented in a form of a functional module. The term "module" herein may be an ASIC, an electronic circuit, a processor (such as a shared processor, a dedicated processor, or a processor group) configured to execute one or more software or firmware programs, a memory, a combinational logic circuit, and/or another appropriate component supporting the described function. In an optional example, a person skilled in the art may understand that the apparatus 600 may be the first network device in the foregoing embodiments, and the apparatus 600 may be configured to perform the procedures and/or steps corresponding to the network device in the foregoing method embodiments. To avoid repetition, details are not described herein again.

It should be understood that the apparatuses in the embodiments of this application that are described in FIG. 5 and FIG. 6 can implement the steps in the foregoing methods. To avoid repetition, details are not described herein again.

Figure 7:
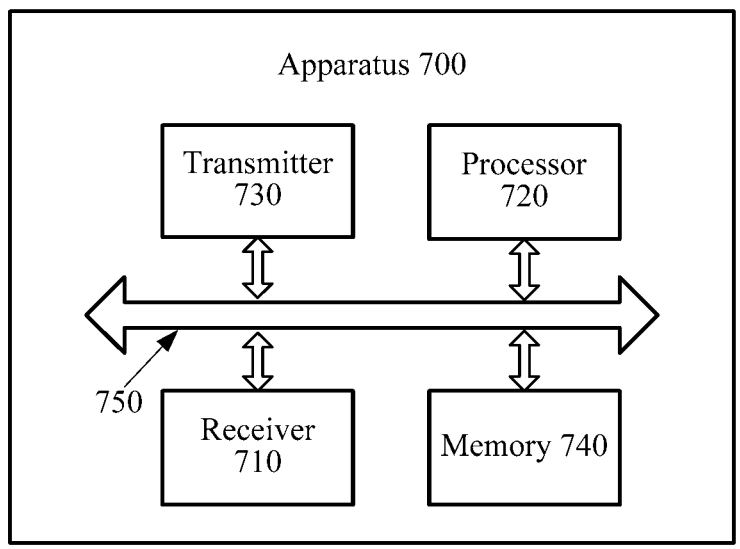
FIG. 7 is a schematic diagram of still another wireless access apparatus according to an embodiment of this application.

FIG. 7 shows a wireless access apparatus 700 according to an embodiment of the present invention. The apparatus 700 includes: a receiver 710, a processor 720, a transmitter 730, a memory 740, and a bus system 750. The receiver 710, the processor 720, the transmitter 730, and the memory 740 are connected by using the bus system 750. The memory 740 is configured to store an instruction. The processor 720 is configured to execute the instruction stored in the memory 740, to control the receiver 710 to receive a signal and control the transmitter 730 to send a signal.

The processor 720 is configured to determine M pilots of N air interface technologies on a carrier. Each of the N air interface technologies corresponds to one of the M pilots, M and N are integers, N is greater than or equal to M, N is greater than or equal to 2, and M is greater than or equal to 1.

The processor 720 is further configured to measure at least one cell by using the M pilots, to generate a measurement report.

The processor 720 is further configured to determine a target cell in the at least one cell based on the measurement report.

In an optional embodiment, the processor 720 is further configured to measure the at least one cell by using one of the M pilots in a same frequency range of a first air interface technology and a second air interface technology in the N air interface technologies, to generate the measurement report. A frequency range of the first air interface technology and a frequency range of the second air interface technology at least partially overlap.

In an optional embodiment, the processor 720 is further configured to measure the at least one cell by separately using a first pilot and a second pilot in the M pilots in respective frequency ranges of a third air interface technology and a fourth air interface technology in the N air interface technologies, to generate the measurement report. The frequency range of the third air interface technology and the frequency range of the fourth air interface technology at least partially do not overlap.

In an optional embodiment, the receiver 710 is configured to: before determining the M pilots of the N air interface technologies on the carrier, receive a system message of the at least one cell. The processor 720 is specifically configured to determine the M pilots of the N air interface technologies on the carrier based on the system message.

In an optional embodiment, the receiver 710 is configured to: before determining the M pilots of the N air interface technologies on the carrier, receive air interface configuration information sent by a network device. The air interface configuration information includes information instructing the terminal device to perform communication by using the N air interface technologies and the M pilots of the N air interface technologies. The processor 720 is specifically configured to determine the M pilots of the N air interface technologies based on the air interface configuration information.

In an optional embodiment, the processor 720 is specifically further configured to determine the target cell in the at least one cell based on a measurement report of any of the N air interface technologies.

In an optional embodiment, the processor 720 is specifically further configured to: before determining the target cell in the at least one cell based on the measurement report, determine a priority order of the N air interface technologies, and determine the target cell in the at least one cell based on the priority order of the N air interface technologies and the measurement report.

In an optional embodiment, the transmitter 730 is configured to: before determining the target cell in the at least one cell based on the measurement report, send the measurement report to the network device, so that the network device determines the target cell in the at least one cell based on the measurement report. The receiver 710 is further configured to receive indication information sent by the network device, and the indication information is used to instruct the terminal device to access the target cell. The determining module 720 is specifically further configured to determine the target cell in the at least one cell based on the indication information.

It should be understood that the apparatus 700 may be specifically the terminal device in the foregoing embodiments, and may be configured to perform the steps and/or procedures corresponding to the terminal device in the foregoing method embodiments. Optionally, the memory 740 may include a read-only memory and a random access memory, and provide an instruction and data to the processor. A part of the memory may further include a non-volatile random access memory. For example, the memory may further store information about a device type. The processor 720 may be configured to execute the instruction stored in the memory, and when the processor executes the instruction, the processor may perform the steps corresponding to the terminal device in the foregoing method embodiments.

Figure 8:
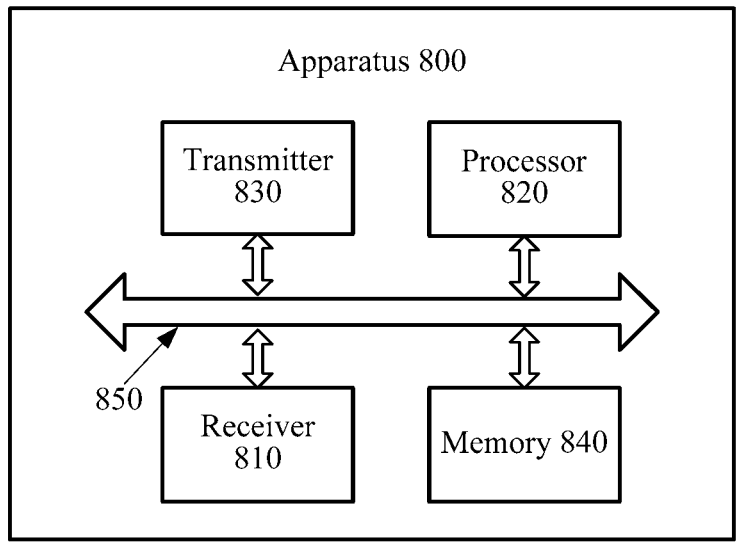
FIG. 8 is a schematic diagram of still another wireless access apparatus according to an embodiment of this application.

FIG. 8 shows a wireless access apparatus 800 according to an embodiment of the present invention. The apparatus 800 includes: a receiver 810, a processor 820, a transmitter 830, a memory 840, and a bus system 850. The receiver 810, the processor 820, the transmitter 830, and the memory 840 are connected by using the bus system 850. The memory 840 is configured to store an instruction. The processor 820 is configured to execute the instruction stored in the memory 840, to control the receiver 810 to receive a signal and control the transmitter 830 to send a signal.

The processor 820 is configured to determine M pilots of N air interface technologies on a carrier. Each of the N air interface technologies corresponds to one of the M pilots, M and N are integers, N is greater than or equal to M, N is greater than or equal to 2, and M is greater than or equal to 1.

The transmitter 830 is configured to send the M pilots to a terminal device, and the M pilots are used to measure at least one cell.

In an optional embodiment, the transmitter 830 is further configured to: after sending the M pilots to the terminal device, send first indication information to the terminal device. The first indication information is used to instruct the terminal device to measure the at least one cell by using one of the M pilots in a same frequency range of a first air interface technology and a second air interface technology in the N air interface technologies, and a frequency range of the first air interface technology and a frequency range of the second air interface technology at least partially overlap.

In an optional embodiment, the transmitter 830 is further configured to: after sending the M pilots to the terminal device, send second indication information to the terminal device. The second indication information is used to instruct the terminal device to measure the at least one cell by separately using a first pilot and a second pilot in the M pilots in respective frequency ranges of a third air interface technology and a fourth air interface technology in the N air interface technologies, to generate a measurement report, and the frequency range of the third air interface technology and the frequency range of the fourth air interface technology at least partially do not overlap.

In an optional embodiment, the transmitter 830 is further configured to: before sending the M pilots to the terminal device, send air interface configuration information to the terminal device. The air interface configuration information includes information instructing the terminal device to perform communication by using the N air interface technologies.

In an optional embodiment, the receiver 810 is configured to: after sending the first indication information to the terminal device, receive the measurement report sent by the terminal device. The processor 820 is further configured to determine a target cell in the at least one cell based on the measurement report. The transmitter 830 is further configured to send third indication information to the terminal device, and the third indication information is used to instruct the terminal device to access the target cell.

In an optional embodiment, the processor 820 is specifically further configured to determine the target cell based on the measurement report and an air interface technology type supported by the at least one cell.

In an optional embodiment, the transmitter 830 is further configured to: before sending the third indication information to the terminal device, send an access request message to a second network device serving the target cell. The access request message is used by the terminal device to access the target cell, and the access request message carries types of a plurality of air interface technologies supported by the terminal device. The receiver 810 is further configured to receive an acknowledgment message of the access request message that is sent by the second network device. The transmitter 830 is specifically further configured to send the third indication information to the terminal device based on the acknowledgment message of the access request.

It should be understood that the apparatus 800 may be specifically the first network device in the foregoing embodiments, and may be configured to perform the steps and/or procedures corresponding to the first network device in the foregoing method embodiments. Optionally, the memory 840 may include a read-only memory and a random access memory, and provide an instruction and data to the processor. A part of the memory may further include a non-volatile random access memory. For example, the memory may further store information about a device type. The processor 820 may be configured to execute the instruction stored in the memory, and when the processor executes the instruction, the processor may perform the steps corresponding to the terminal device in the foregoing method embodiments.

It should be understood that the apparatuses in the embodiments of the present invention that are described in FIG. 7 and FIG. 8 can implement the steps in the foregoing methods. To avoid repetition, details are not described herein again.

It should be understood that in this embodiment of the present invention, the processor may be a central processing unit (Central Processing Unit, CPU); or the processor may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor; or the processor may be any conventional processor or the like.

In an implementation process, the steps in the foregoing methods can be implemented by using a hardware integrated logical circuit in the processor, or by using an instruction in a form of software. The steps of the method disclosed with reference to the embodiments of the present invention may be directly performed by a hardware processor, or may be performed by using a combination of hardware of the processor and a software module. The software module may be located in a mature storage medium in the art, such as a random access memory, a flash memory, a read-only memory, a programmable read-only memory, an electrically-erasable programmable memory, or a register. The storage medium is located in the memory, and the processor executes the instruction in the memory and performs the steps in the foregoing methods in combination with the hardware of the processor. To avoid repetition, details are not described herein again.

It should be understood that the apparatuses in the embodiments of the present invention that are described in FIG. 7 and FIG. 8 can implement the steps in the foregoing methods. To avoid repetition, details are not described herein again.

Figure 9:
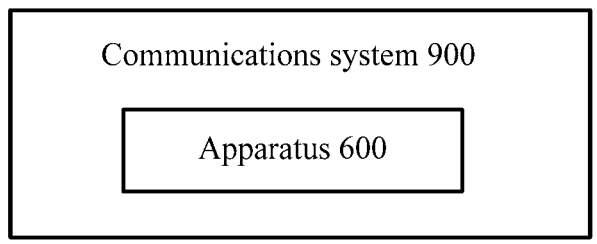
FIG. 9 is a schematic structural diagram of a wireless access communications system according to an embodiment of this application.

FIG. 9 is a schematic structural diagram of a wireless access communications system 900 according to an embodiment of the present invention. The communications system 900 includes the apparatus 600.

Figure 10:
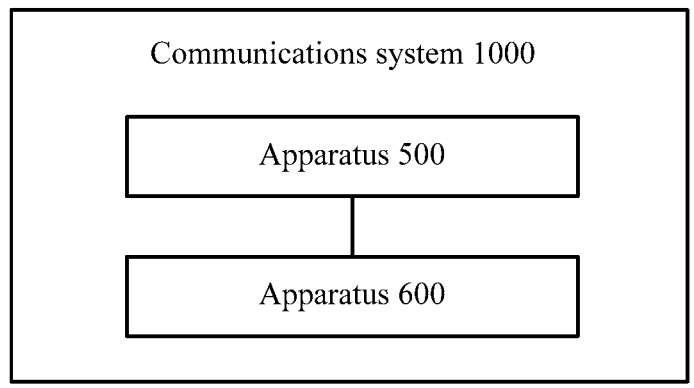
FIG. 10 is a schematic structural diagram of another wireless access communications system according to an embodiment of this application.

FIG. 10 is a schematic structural diagram of a wireless access communications system 1000 according to an embodiment of the present invention. The communications system 1000 includes the apparatus 500 and the apparatus 600.

Figure 11:
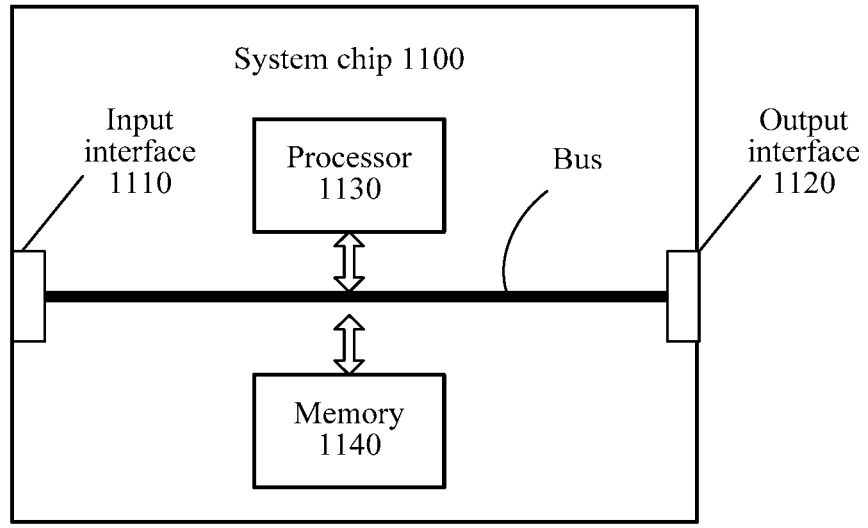
FIG. 11 is a schematic structural diagram of a wireless access system chip according to an embodiment of this application.

FIG. 11 is a schematic structural diagram of a wireless access system chip according to an embodiment of the present invention. The system chip 1100 in FIG. 11 includes: an input interface 1110, an output interface 1120, at least one processor 1130, and a memory 1140. The input interface 1110, the output interface 1520, the processor 1130, and the memory 1140 are connected by using a bus. The processor 1130 is configured to execute code in the memory 1140, and when the code is executed, the processor 1130 implements the method performed by the terminal device in FIG. 2.

Figure 12:
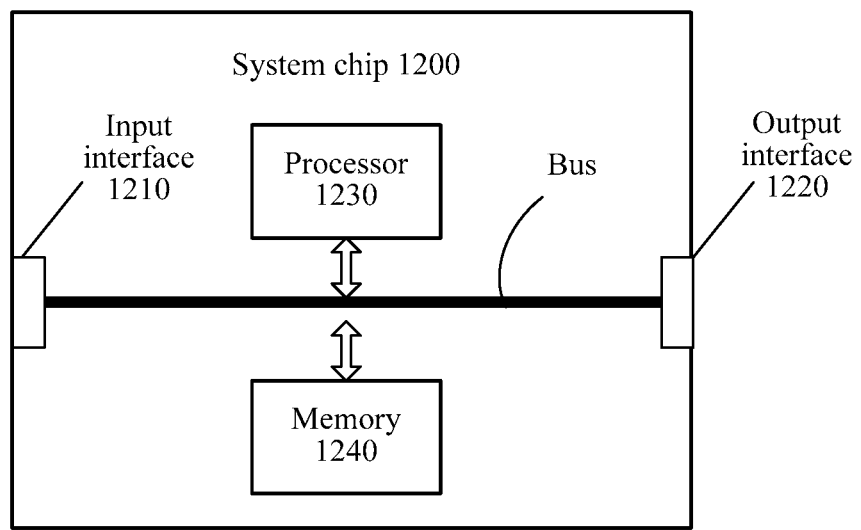
FIG. 12 is a schematic structural diagram of another wireless access system chip according to an embodiment of this application.

FIG. 12 is a schematic structural diagram of a wireless access system chip according to an embodiment of the present invention. The system chip 1200 in FIG. 12 includes: an input interface 1210, an output interface 1220, at least one processor 1230, and a memory 1240. The input interface 1210, the output interface 1220, the processor 1230, and the memory 1240 are connected by using a bus. The processor 1230 is configured to execute code in the memory 1240, and when the code is executed, the processor 1230 implements the method performed by the network device in FIG. 3.

A person of ordinary skill in the art may be aware that, in combination with the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A wireless access method comprising:
   determining, by a terminal device, a priority order of a plurality of N air interface (AI) technologies on a carrier;
   after determining the priority order, determining, by the terminal device, at least one M pilots of the plurality of N AI technologies on the carrier, wherein each of the N AI technologies corresponds to one of the M pilots, M and N are integers, and N is greater than or equal to M, and wherein:
      N is greater than or equal to 2, and
      M is greater than or equal to 1;
   measuring, by the terminal device, at least one cell using the M pilots, to generate a measurement report; and
   determining, by the terminal device, a target cell in the at least one cell based on the measurement report,
   receiving, by the terminal device, first indication information, wherein:
      the first indication information is used to instruct the terminal device to measure the at least one cell by using one of the M pilots in a same frequency range of a first AI technology and a second AI technology of the N AI technologies, and
      a frequency range of the first AI technology and a frequency range of the second AI technology at least partially overlap.

2. The method according to claim 1, wherein the measuring, by the terminal device, at least one cell using the M pilots, to generate a measurement report comprises:
   measuring, by the terminal device, the at least one cell using one of the M pilots in a same frequency range of a first AI technology and a second AI technology of the N AI technologies, to generate the measurement report, wherein a frequency range of the first AI technology and a frequency range of the second AI technology at least partially overlap.

3. The method according to claim 1, wherein the measuring, the terminal device, at least one cell using the M pilots, to generate a measurement report comprises:
measuring, by the terminal device, the at least one cell by separately using a first pilot and a second pilot in the M pilots in respective frequency ranges of a third AI technology and a fourth AI technology of the N AI technologies, to generate the measurement report, wherein a frequency range of the third AI technology and a frequency range of the fourth AI technology at least partially do not overlap.

4. The method according to claim 1, wherein:
before the determining, by a terminal device, at least one M pilots of a plurality of N AI technologies on a carrier, the method further comprises:
receiving, by the terminal device, a system message of the at least one cell; and
the determining, by a terminal device, at least one M pilots of a plurality of N AI technologies on a carrier comprises:
determining, by the terminal device, the M pilots of the N AI technologies on the carrier based on the system message.

5. The method according to claim 1, wherein:
before the determining, by a terminal device, at least one M pilots of a plurality of N AI technologies on a carrier, the method further comprises:
receiving, by the terminal device, AI configuration information sent by a network device, wherein the AI configuration information comprises information instructing the terminal device to perform communication by using the N AI technologies and the M pilots of the N AI technologies; and
the determining, by a terminal device, at least one M pilots of a plurality of N AI technologies on a carrier comprises:
determining, by the terminal device, the M pilots of the N AI technologies on the carrier based on the AI configuration information.

6. The method according to claim 1, wherein the determining, by the terminal device, a target cell in the at least one cell based on the measurement report comprises:
determining, by the terminal device, the target cell in the at least one cell based on a measurement report of any of the N AI technologies.

7. The method according to claim 1, wherein:
the determining, by the terminal device, a target cell in the at least one cell based on the measurement report comprises:
determining, by the terminal device, the target cell in the at least one cell based on the priority order of the N AI technologies and the measurement report.

8. The method according to claim 1, wherein:
before the determining, by the terminal device, a target cell in the at least one cell based on the measurement report, the method further comprises:
sending, by the terminal device, the measurement report to a network device, so that the network device may determine the target cell in the at least one cell based on the measurement report; and
receiving, by the terminal device, indication information sent by the network device, wherein the indication information is used to instruct the terminal device to access the target cell; and the determining, by the terminal device, a target cell in the at least one cell based on the measurement report comprises:
determining, by the terminal device, the target cell in the at least one cell based on the indication information.

9. A wireless access apparatus, comprising:
a processor; and
a non-transitory computer readable medium storing computer executable instructions, that when executed by the processor cause the following steps to be performed:
determining a priority order of a plurality of N air interface (AI) technologies on a carrier;
after determining the priority order, determining at least one M pilots of the plurality of N AI technologies on the carrier, wherein each of the N AI technologies corresponds to one of the M pilots, M and N are integers, and N is greater than or equal to M, and wherein:
N is greater than or equal to 2, and
M is greater than or equal to 1;
measuring at least one cell by using the M pilots, to generate a measurement report; and
determining a target cell in the at least one cell based on the measurement report,
receiving first indication information, wherein:
the first indication information is used to instruct the apparatus to measure the at least one cell by using one of the M pilots in a same frequency range of a first AI technology and a second AI technology of the N AI technologies, and
a frequency range of the first AI technology and a frequency range of the second AI technology at least partially overlap.

10. The apparatus according to claim 9, wherein:
the steps further comprise scanning a synchronization channel on the carrier based on an AI type supported by a terminal device; and
the step of determining the at least one M pilots of the plurality of N AI technologies on the carrier comprises:
determining the at least one M pilots based on information about the synchronization channel.

11. The apparatus according to claim 9, wherein the step of measuring the at least one cell by using the M pilots, to generate a measurement report, comprises:
measuring the at least one cell using the M pilots, to generate the measurement report of at least one AI based on the determined priority order.

12. The apparatus according to claim 10, wherein a relationship between the synchronization channel and the pilot is pre-determined.

13. The apparatus according to claim 9, wherein the measurement report includes a result of the measurement performed by at least one terminal device on the at least one cell in a frequency range of the AI technology supported by the at least one terminal device.

14. The apparatus according to claim 9, wherein the steps further comprise:
accessing the determined target cell from a current cell.

15. The apparatus according to claim 9, wherein M is greater than or equal to 2, and wherein the steps further comprise:
determining a plurality of target cells based on measurement reports separately generated using the M pilots; and simultaneously accessing the determined plurality of target cells using different AI technologies.

16. A wireless access apparatus, comprising:
a processor, configured to:
   determine a priority order of a plurality of N air interface (AI) technologies on a carrier; and
   after determining the priority order, determine at least one M pilots of a plurality of N AI technologies on the carrier, wherein each of the N AI technologies corresponds to one of the M pilots, M and N are integers, and N is greater than or equal to M, and wherein:
   N is greater than or equal to 2, and
   M is greater than or equal to 1; and
a transceiver, configured to send the M pilots to a terminal device, wherein the M pilots are used to measure at least one cell,
wherein the transceiver is further configured to:
after sending the M pilots to the terminal device, send first indication information to the terminal device, wherein:
   the first indication information is used to instruct the terminal device to measure the at least one cell by using one of the M pilots in a same frequency range of a first AI technology and a second AI technology of the N AI technologies, and
   a frequency range of the first AI technology and a frequency range of the second AI technology at least partially overlap.

17. The apparatus according to claim 16, wherein the transceiver is further configured to:
after sending the M pilots to the terminal device, send second indication information to the terminal device, wherein:
   the second indication information is used to instruct the terminal device to measure the at least one cell by separately using a first pilot and a second pilot of the M pilots in respective frequency ranges of a third AI technology and a fourth AI technology in the N AI technologies, to generate a measurement report, and
   a frequency range of the third AI technology and a frequency range of the fourth AI technology at least partially do not overlap.

18. The apparatus according to claim 16, wherein the transceiver is further configured to:
before sending the M pilots to the terminal device, send AI configuration information to the terminal device, wherein the AI configuration information comprises information instructing the terminal device to perform communication by using the N AI technologies.

* * * * *